United States Patent Office 3,359,216
Patented Dec. 19, 1967

3,359,216
RESINOUS PRODUCTS BASED ON EPOXY RESINS AND HALOGENATED AMINES AND METHOD FOR PREPARATION OF SAME
Laszlo Szobel, Grenoble, and Ludovic Parvi, Pont de Claix, France, assignors to Societe d'Electro-Chimie, d'Electro-Metallurgie et des Acieries Electriques d'Elgine, Paris, France, a corporation of France
No Drawing. Filed July 10, 1963, Ser. No. 294,172
Claims priority, application France, July 11, 1962, PV 903,672
9 Claims. (Cl. 260—2)

This invention relates to:

(1) Resinous, thermosetting compositions formed from a mixture of at least one epoxy resin and of a polyamine derived from a halogenated diphenyl, the latter acting as a curing agent for the resin;

(2) A process for the preparation of these compositions;

(3) Thermo-cured resins obtained from these compositions and characterized by excellent flame-resistant properties.

All the compounds possessing epoxy groups of the formula:

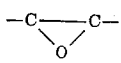

may be incorporated in the resinous compositions of the invention. These compounds may, in particular, be epoxy resins formed by:

(A) A glycidic polyether derived from a polychloroorganic compound, or (B) A non-glycidic compound possessing several epoxy groups per molecule, or (C) A mixture of varying proportions of the above compounds of A and B.

The resins of group A, which are incorporated into the thermosetting compositions of the invention, comprise all the products of reaction between the polyhydroxylated alcoholic and phenolic compounds, such as: butanediol, glycerin, resorcinol, hydroquinone, diphenylolpropane (bisphenol A) and an epichlorohydrin.

The resins of group B comprise the acyclic aliphatic products such as the epoxidized polyolefins of which the most usual are the "Oxiran" resins (epoxidized polybutadienes made by Food Machinery & Chem. Corpn.), the epoxidized derivatives of unsaturated fatty acid glycerides, and cyclic aliphatic products such as limonene dioxide, vinylcyclohexene dioxide, dicyclopentadiene dioxide.

The polyamine derived from the halogenated diphenyl is a compound of the general formula:

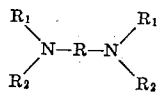

in which

R represents a polyhalo-diphenyl radical, with at least 4 atoms of halogen,
N represents an amine function which is one of primary, secondary, or tertiary,
Each of $R_1$ and $R_2$ is independently selected from the group consisting of an atom of hydrogen, a saturated aliphatic radical, an unsaturated aliphatic radical, a cyclic radical and a heterocyclic radical, each said radical having at least one primary amine function.

Of the polyamines derived from the halogenated diphenyl, the particularly suitable ones are those in which:

R represents the different isomers of the octochlorodiphenyl radical taken separately and in mixture,
N represents a tertiary amine function,
the radicals $R_1$ and $R_2$ are selected independently from the group consisting of an atom of hydrogen and an aliphatic radical containing less than 3 atoms of carbon.

The various isomers of N,N'-bis(ethylamino) diamino octochlorodiphenyl resulting from the condensation of decachlorodiphenyl with ethylene diamine, are preferable.

These isomers and their preparation are disclosed in our co-pending U.S. patent application Ser. No. 285,869, filed June 6, 1963, and relating to "Novel Industrial Products Formed by Biaminated Derivatives of Polychlorodiphenyl."

The proportions of polyamine used in the resinous thermosetting compositions according to the invention, depend on the nature of the epoxy resin and on the properties desired in the final cured product. In general, the quantity varies between 0.8 and $3NH_2$ equivalent per epoxy equivalent, and an amount close to 2 is preferred. The term "equivalent" represents the quantity of material evaluated in grams, containing either an $NH_2$ group or an epoxy group.

The resinous compositions according to the invention are prepared in various ways. In one method, they are obtained by simple cold mixing or mixing at ambient temperature of the constituents, and, in a second method, by introduction of the epoxy resin into the molten and degassed hardener or curing agent at a temperature between 70° C. and 140° C. A third method comprises the introduction of the curing agent in solution in an appropriate solvent, into the resin; one can use known solvents such as, for example, allyl-butylglycidic ether, methallyl-butylglycidic ether, diacetonalcohol.

Where the curing agent is N,N'-bis(ethylamino) diamino octochlorodiphenyl, a satisfactory method is addition of the epoxy resin to the molten curing agent at 80° C. and free of gas, then cooling the mixture quickly to ambient temperature. In these conditions, one obtains mixtures which keep for a long period, which is a feature of great interest to the user.

According to another method, one adds one or more other curing agents of acidic or basic nature in varying quantities to the polyamine derived from the halogenated diphenyl.

It is always possible to incorporate inert fillers, pigments, plasticizers, reactive or non-reactive diluents, or mixtures of these different compounds, in the different resinous compositions according to the invention.

The curing conditions of said compositions essentially depend on the nature of the epoxy resin employed, and where appropriate, of the other curing agents associated therewith. In general, the best conditions are obtained with curing periods amounting to 24 to 48 hours and temperatures lying between 100° C. and 200° C., preferably between 100° C. and 140° C. The resins thermocured under these conditions possess excellent flame-resistant properties and display mechanical and thermal properties of interest.

The thermosetting compositions according to the invention may be used in the preparation of cast masses, laminated products, paints, expanded of foam materials, in the production of objects intended for the electrical and/or electronics industry, for the sheathing of components, etc.

A pronounced advantage of the resinous compositions and cured resins according to the invention resides in their selfextinguishing properties according to ASTM D 635-56 T test; this advantage comes principally from the nature of the thermosetting agents used according to the invention.

Another advantage resides in the particularly prolonged potlife of the resinous compositions.

The following, non-limiting examples exemplify the invention:

Example 1

A resinous composition according to the invention was prepared by mixing, at 80° C., 130 parts of N,N'-bis(ethylamino) diamino octochlorodiphenyl as a hardener (or hardening agent) with 100 parts of "Araldite RD2" resin (mark registered by the Ciba Company, and denoting a product of condensation between butanediol and epichlorohydrin). Thereafter, this composition was cured for 24 hours at 120° C., and cured again for 2 hours at 140° C.

The product obtained was hard, transparent and colored yellow. Its properties are given below (Column 1) in comparison with "Araldite RD2" resin cured under analogous conditions with 46 parts of 4,4'-diamino-diphenylsulphone to 100 parts of resin (Column 2).

| | Column 1 | Column 2 |
|---|---|---|
| Specific weight in g./cm.$^3$ | 1.39 | 1.27 |
| Impact strength (notched IZOD specimen) according to ASTM D 256-56 in kg./25 mm. of notch | 0.136 | 0.177 |
| Rockwell hardness according to ASTM D 785-51, scale M | 68 | 76 |
| 1/10 Vicat point according to ASTM D 1525-58 T in ° C | 56 | 52 |
| Inflammability according to ASTM 635-56 T in mm./min | (*) | 19.0 |

*Self-extinguishing.

The self-extinguishability of the composition obtained in accordance with the invention points up its distinct superiority as opposed to the composition hardened by curing agents different from those of the invention.

Example 2

A composition was prepared under the conditions described in Example 1 and was formed by 120 parts of N,N'-bis(ethylamino) diamino octochlorodiphenyl as a hardener with 100 parts of "Araldite 103" resin (mark registered by the Ciba Company, and denoting a product of condensation between epichlorohydrin and bisphenol A).

The product obtained was hard, transparent, and colored yellow.

Its characteristics determined by the tests specified in Example 1 are given in Column 1 below in comparison with those of the same resin cured under analogous conditions with 25 parts of 4,4'-diamino-diphenylsulphone to 100 parts of resin (Column 2).

| | Column 1 | Column 2 |
|---|---|---|
| Specific weight | 1.39 | 1.23 |
| Impact strength | 0.045 | 0.082 |
| Rockwell hardness | 103 | 110 |
| 1/10 Vicat point | 75.5 | 88.5 |
| Inflammability | (*) | 12.7 |

*Self-extinguishing.

The self-extinguishability of the composition obtained in accordance with the invention points up its distinct superiority as opposed to the composition hardened by curing agents different from those of the invention.

Example 3

A composition was prepared under the conditions described in Example 1, and was formed by a mixture of 130 parts of N,N'-bis(ethylamino) diamino octochlorodiphenyl as a hardener with 100 parts of "Epikote 812" resin (mark registered by the Shell Company, and denoting a product of condensation between epichlorohydrin and glycerin).

The product obtained was hard, transparent, and colored yellow.

Its characteristics determined according to the tests specified in Example 1, are given in Column 1 below in comparison with the same resin cured under analogous conditions with 42 parts of 4,4'-diamino-diphenylsulphone to 100 parts of resin:

| | Column 1 | Column 2 |
|---|---|---|
| Specific weight | 1.45 | 1.35 |
| Impact strength | 0.068 | 0.083 |
| Rockwell hardness | 87 | 112 |
| 1/10 Vicat point | 72.5 | 81 |
| Inflammability | (*) | 7 |

* Self-extinguishing.

The self-extinguishability of the composition obtained in accordance with invention points up its distinct superiority as opposed to the composition hardened by curing agents different from those of the invention.

Example 4

Under the conditions described in Example 1, a composition was prepared and was composed of 70 parts of N,N,N',N'-tetrakis(ethyl 2-amino) diamino octochlorodiphenyl as a hardener with 100 parts of resin "Araldite 103" (trademark registered by the Ciba Company, and designating a product of condensation of epichlorohydrin and bisphenol A).

The product obtained was hard, transparent, and colored yellow.

Its properties measured according to the tests shown in Example 1 are set forth in Column 1 below in comparison with those of the same resin hardened under analogous conditions with 25 parts of 4,4'-diamino-diphenylsulphone for 100 parts of resin (Column 2).

| | Column 1 | Column 2 |
|---|---|---|
| Specific weight | 1.39 | 1.23 |
| Impact strength | 0.06 | 0.082 |
| Rockwell hardness | 106 | 110 |
| 1/10 Vicat point | 79.8 | 88.5 |
| Inflammability | (*) | 12.7 |

* Self-extinguishing.

The self-extinguishability of the composition obtained according to the invention points up its distinct superiority as opposed to the composition hardened by curing agents different from those of the invention.

Example 5

A resinous composition was prepared in accordance with the invention by mixing, at 80° C., 70 parts of N,N,N', N'-tetrakis(ethyl 2-amino)diamino octochlorodiphenyl as a hardener with 100 parts of resin "Araldite RD2" (a trademark registered by the Ciba Company, and designating a product of condensation of butanediol and epichlorohydrin). This composition was hardened for 24 hours at 120° C. and hardened again for 2 hours at 140° C.

The product obtained was hard, transparent, and colored yellow.

Its properties are shown below (Column 1) in comparison with those of resin "Araldite RD2" hardened in an analogous manner with 46 parts of 4,4'-diamino-diphenylsulphone to 100 parts of resin (Column 2).

|  | Column 1 | Column 2 |
|---|---|---|
| Specific weight | 1.38 | 1.27 |
| Impact strength (notched IZOD specimen) according to ASTM D 256-56 in kg./25 mm. impact | 0.152 | 0.177 |
| Rockwell hardness according to ASTM D 785-51, M scale | 72 | 76 |
| 1/10 Vicat point according to ASTM D 1525-58 T, ° C | 54 | 52 |
| Inflammability according to ASTM D 635-56 T in mm./min | (*) | 19.0 |

*Self-extinguishing.

The self-extinguishability of the composition obtained according to the invention points up its distinct superiority as opposed to the composition hardened by curing agents different from those of the invention.

*Example 6*

A resinous composition was prepared according to the invention by mixing, at 80° C., 55 parts of octochlorobis(triethylenetetramine) diphenyl as a hardener, with 100 parts of resin "Araldite RD2" (a trademark registered by the Ciba Company, and designating a produce of condensation of butanediol and epichlorohydrin). This composition was hardened for 24 hours at 120° C. and hardened again for 2 hours at 140° C.

The product obtained was hard, transparent, and colored yellow.

Its properties are shown below (Column 1) in comparison with those of resin "Araldite RD2" hardened in similar manner with 46 parts of 4,4'-diamino-diphenylsulphone for 100 parts of resin (Column 2).

|  | Column 1 | Column 2 |
|---|---|---|
| Specific weight | 1.38 | 1.27 |
| Impact strength (notched IZOD specimen) according to ASTM D 256-56 in kg./25 mm. of impact | 0.160 | 0.177 |
| Rockwell hardness according to ASTM D 785-51, M scale | 73 | 76 |
| 1/10 Vicat point according to ASTM D 1525-58 T, ° C | 53 | 52 |
| Inflammability according to ASTM D 635-56 T in mm./min | (*) | 19.0 |

*Self-extinguishing.

The self-extinguishability of the composition obtained according to the invention points up its distinct superiority as opposed to the composition hardened by curing agents different from those of the invention.

While we have shown and described preferred embodiments of our invention, it may be otherwise embodied within the scope of the appended claims.

*Example 7*

One realizes a resinous composition according to the invention, by mixing at 80° C. 130 parts of N,N'-bis (ethyl 2-amino) diaminohexachlorodiphenyl and 100 parts of resin "Araldite RD2" (registered trademark by the Ciba Company to indicate a condensation product between butanediol and epichlorohydrin). This composition has been hardened for 24 hours at 120° C., then for 2 hours at 140° C.

The product obtained was hard, transparent, slightly yellow colored. Its properties are indicated, here-under (Column 1) in comparison with those of resin "Araldite RD2" hardened in the same way with 46 parts of diamino diphenylsulfone for 100 parts of resin (Column 2).

|  | Column 1 | Column 2 |
|---|---|---|
| Specific weight | 1.36 | 1.27 |
| Impact strength | 0.149 | 0.177 |
| Rockwell hardness | 71 | 76 |
| 1/10 Vicat point | 54 | 52 |
| Inflammability | (*) | 19 |

*Self extinguishing.

We claim:
1. A resinous thermosetting composition comprising a mixture of at least one epoxy resin consisting of a glycidic polyether produced by the reaction between polyhydroxylated alcoholic and phenolic compounds and an epichlorohydrin and a curing agent consisting of a polyamine derived from a halogenated diphenyl having the general formula:

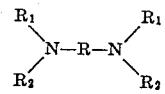

in which R represents different isomers of octochlorodiphenyl radical taken separately and in mixture, N represents an amine function which in one of primary, secondary, or tertiary, and each of $R_1$ and $R_2$ being independently selected from the group consisting of an atom of hydrogen and a saturated aliphatic radical, each of said radicals having at least one primary amine function, and where said curing agent in said mixture is in an amount between 0.8 and 3.0 amino equivalent per epoxy equivalent.

2. A composition as set forth in claim 1 in which said polyhydroxylated alcoholic and phenolic compounds are selected from the group consisting of butanediol, glycerin, resorcinol, hydroquinone, and bis-(4-hydroxy phenyl)-dimethylmethane.

3. A resinous thermosetting composition comprising a mixture of at least one epoxy resin and a curing agent, said epoxy resin being a nonglycidic compound having at least two epoxy groups per molecule and said curing agent being a polyamine derived from a halogenated diphenyl having the general formula:

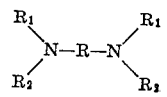

in which R represents different isomers of octochlorodiphenyl radical taken separately and in mixture, N represents an amine function which is one of primary, secondary, or tertiary, and each of $R_1$ and $R_2$ is independently selected from the group consisting of an atom of hydrogen and a saturated aliphatic radical, each said radical having at least one primary amine function, said curing agent being in said mixture in an amount between 0.8 and 3.0 amino equivalent per epoxy equivalent.

4. A composition as set forth in claim 3, wherein said nonglycidic compound is selected from the group consisting of epoxidized polyolefins, epoxidized unsaturated fatty acid glycerides, limonene dioxide, vinylcyclohexene dioxide and dicyclopentadiene dioxide.

5. A resinous thermosetting composition comprising a mixture of at least one epoxy resin and a curing agent, said epoxy resin being a mixture of glycidic polyether produced by the reaction between polyhydroxylated alcoholic and phenolic compounds and epichlorohydrin and a nonglycidic compound having at least two epoxy groups per molecule, said curing agent being a polyethylene derived from a halogenated diphenyl having the general formula:

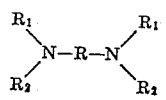

in which R represents different isomers of octochlorodiphenyl radical taken separately and in mixture, N represents an amine function which is one of primary, secondary, and tertiary, and each of $R_1$ and $R_2$ being independently selected from a group consisting of an atom of hydrogen and a saturated aliphatic radical, each of said radicals having at least one primary amine function, said curing agent being in the mixture in an amount between 0.8 and 3.0 amino equivalent per epoxy equivalent.

6. A composition as set forth in claim 5 characterized by said polyhydroxylated alcoholic and phenolic compounds being selected from the group consisting of butanediol, glycerin, resorcinol, hydroquinone and bis-(4-hydroxyphenyl)-dimethylmethane, and said nonglycidic compound being selected from the group consisting of epoxidized polyolefins, epoxidized unsaturated fatty acid glycerides, limonene dioxide, vinylcyclohexene dioxide and dicyclopentadiene dioxide.

7. The composition of claim 1 characterized by the curing agent being N,N'-bis(ethylamino)diamino octochlorodiphenyl.

8. The composition of claim 3 characterized by said curing agent being N,N'-bis(ethylamino) diamino octochlorodiphenyl.

9. The composition of claim 5 characterized by said curing agent being N,N'-bis(ethylamino) diamino octochlorodiphenyl.

References Cited

UNITED STATES PATENTS

| | | | |
|---|---|---|---|
| 2,935,488 | 5/1960 | Phillips et al. | 260—47 |
| 2,989,502 | 6/1961 | Prescott et al. | 260—47 |

FOREIGN PATENTS

| | | |
|---|---|---|
| 1,098,124 | 1/1961 | Germany. |

WILLIAM H. SHORT, *Primary Examiner.*

T. PERTILLA, *Assistant Examiner.*